US008011519B2

(12) United States Patent
Brundage

(10) Patent No.: US 8,011,519 B2
(45) Date of Patent: Sep. 6, 2011

(54) MULLITE MODULE FOR LIQUID FILTRATION

(75) Inventor: Kevin Robert Brundage, Corning, NY (US)

(73) Assignee: Corning Incorporated, Corning, NY (US)

( * ) Notice: Subject to any disclaimer, the term of this patent is extended or adjusted under 35 U.S.C. 154(b) by 197 days.

(21) Appl. No.: 12/276,028

(22) Filed: Nov. 21, 2008

(65) Prior Publication Data

US 2010/0038308 A1  Feb. 18, 2010

Related U.S. Application Data

(60) Provisional application No. 61/089,718, filed on Aug. 18, 2008.

(51) Int. Cl.
*B01D 24/00* (2006.01)
*B01D 71/02* (2006.01)
*B01D 69/04* (2006.01)

(52) U.S. Cl. .................. 210/510.1; 428/446; 264/638; 422/180

(58) Field of Classification Search .................. None
See application file for complete search history.

(56) References Cited

U.S. PATENT DOCUMENTS

| 4,278,544 | A | * | 7/1981 | Takashima | 210/503 |
| 4,601,997 | A | | 7/1986 | Speronello | 502/263 |
| 4,608,357 | A | | 8/1986 | Silverman et al. | 502/84 |
| 4,628,042 | A | | 12/1986 | Speronello | 502/263 |
| 4,781,831 | A | | 11/1988 | Goldsmith | 210/247 |
| 4,826,790 | A | | 5/1989 | Jones et al. | 501/80 |
| 4,921,616 | A | | 5/1990 | Minjolle | 210/767 |
| 4,935,390 | A | | 6/1990 | Horiuchi et al. | 501/128 |
| 4,950,628 | A | | 8/1990 | Landon et al. | 501/119 |
| 4,983,423 | A | | 1/1991 | Goldsmith | 427/230 |
| 5,173,349 | A | | 12/1992 | Yavuz | 428/116 |
| 6,238,618 | B1 | | 5/2001 | Brundage et al. | 264/638 |
| 6,254,822 | B1 | | 7/2001 | Brundage | 264/638 |
| 7,306,642 | B2 | | 12/2007 | Hayward et al. | 55/523 |
| 2007/0220871 | A1 | * | 9/2007 | Zuberi et al. | 60/299 |

* cited by examiner

*Primary Examiner* — Krishnan S Menon
(74) *Attorney, Agent, or Firm* — Susan S. Wilks

(57) ABSTRACT

The disclosure relates to a material suitable for forming a honeycomb monolith for liquid filtration and, more particularly, to a mullite material for forming a cross-flow filtration device for separating a feed stock into filtrate and retentate, methods for forming the filtration device, and filtration devices formed from the material.

4 Claims, 8 Drawing Sheets

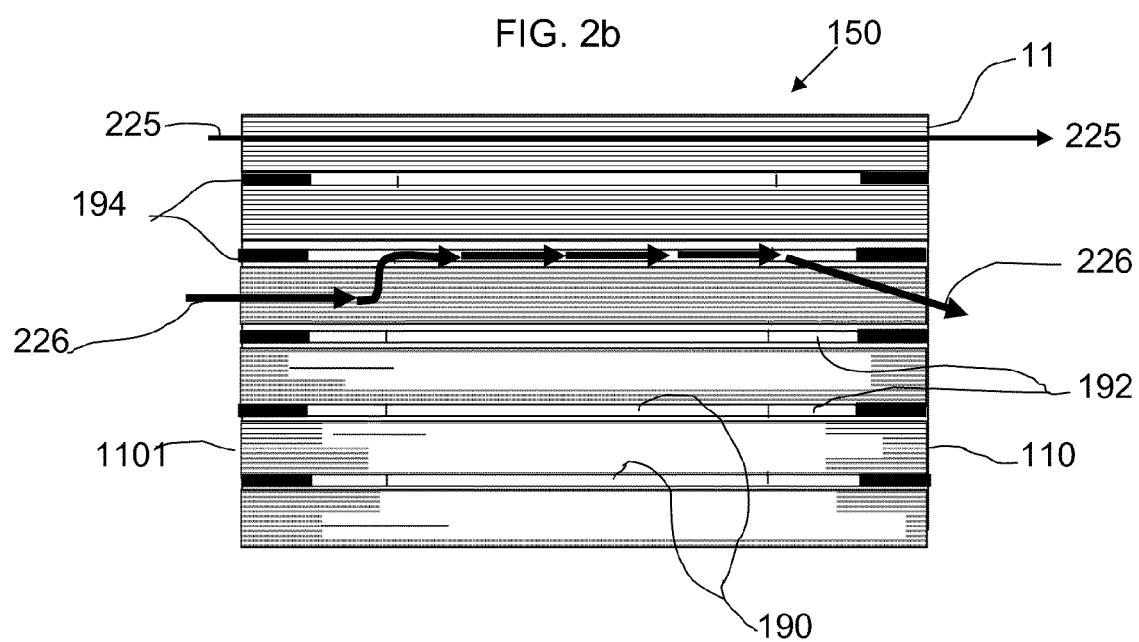

MULLITE MODULE FOR LIQUID FILTRATION

CROSS REFERENCE TO RELATED APPLICATION

This Application claims the benefit of U.S. Provisional Application Ser. No. 61/089,718 filed Aug. 18, 2008 and entitled "Mullite Module for Liquid Filtration".

FIELD

The disclosure relates to a material suitable for forming a honeycomb monolith for liquid filtration and, more particularly, to a mullite material for forming a cross-flow filtration device for separating a feed stock into filtrate and retentate, methods for forming the filtration device, and filtration devices formed from the material.

BACKGROUND

Slotted cross-flow filtration devices have been used to separate contaminated liquid feed stock into cleaner filtrate and retentate (see, for example, U.S. Pat. Nos. 4,781,831, 4,983,423). In applications, these devices need to stand up to liquid streams that may have high pH, low pH, contain dangerous or caustic contaminants, may be heavily contaminated with particulate matter or non-soluble elements, as well as withstand significant pressures. These conditions require materials that can withstand these chemical and physical challenges over long periods of useful life.

SUMMARY

In embodiments, the present invention provides a mullite material for liquid filtration having suitable filtration flux while maintaining suitable strength and corrosion durability. In embodiments, water flow of the mullite material for liquid filtration is higher than 1200 ml/min at 60 psi (or above 140 mDarcy Hg Permeability).

In embodiments, the present invention provides a mullite material for liquid filtration having greater than 30% weight percent mullite and 10-15% weight percent bentenite, and optionally less than 15% fine alumina, optionally between 8 and 42% coarse alumina; and optionally 2 to 10% silica to a total weight percent of 100%; and a superaddition of pore former having 10-15% graphite and 5-15% potato starch.

Embodiments of the present invention also provide a method for forming a filtration device for receiving a process stream and for separating the process stream into a filtrate and a retentate comprising the steps of: dry blending greater than 30% weight percent mullite and 10-15% weight percent bentenite, and optionally less than 15% fine alumina, optionally between 8 and 42% coarse alumina; and optionally 2 to 10% silica to a total weight percent of 100%; adding a superaddition of pore former having 10-15% graphite and 5-15% potato starch; adding sufficient water to form a deformable batch; extruding the batch; and sintering at a temperature of greater than 1550° C.

In a still further embodiment, the invention provides a sintered ceramic article made from a composition comprising greater than 30% mullite; 10-15% bentolite; less than 15% fine alumina; optionally 10-42% coarse alumina; and optionally 2-10% silica; wherein the ceramic article further comprises pores having a median pore diameter of 8-11 µm.

Additional embodiments and advantages of the disclosure will be set forth, in part, in the detailed description, and any claims which follow, or can be learned by practice of the disclosure. The foregoing general description and the following detailed description are exemplary and explanatory only and are not restrictive.

BRIEF DESCRIPTION OF THE DRAWINGS

The accompanying drawings illustrate certain embodiments of the disclosure.

FIG. 2b is a schematic cross-sectional view of the monolith body shown in FIG. 2a, taken at plane b-b shown in FIG. 2a.

DETAILED DESCRIPTION

Figure 1:
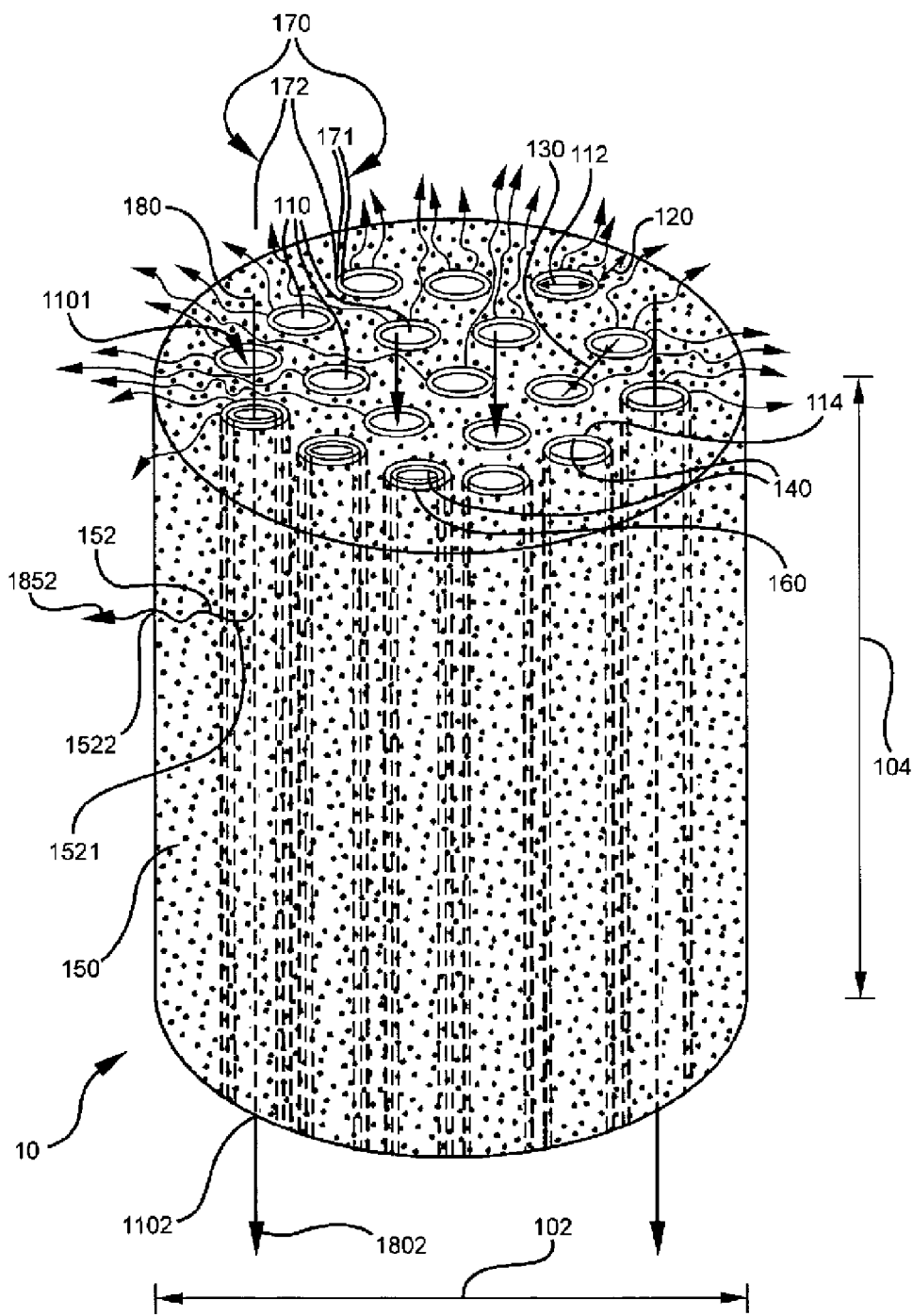
FIG. 1 is a perspective view of an exemplary monolithic body according to the disclosure.

Separating liquids, and separating solid particulate from liquid streams is an important step in many industrial and manufacturing applications. Cross-flow ceramic honeycomb monoliths have been used in these industrial liquid filtration applications. These ceramic monoliths are made from extrudable materials that have an appropriate porosity to allow a mixed fluid stream to enter the ceramic honeycomb monolith through an inlet face, and separate into a filtrate fluid stream and a retentate fluid stream. The filtrate fluid flows into the ceramic honeycomb monolith through the inlet face, flows through the walls of the ceramic monolith, and exits the ceramic honeycomb monolith through the walls of the ceramic monolith or through holes or slots in the ceramic monolith into a filtrate collector. The retentate fluid flows into the ceramic honeycomb monolith through the inlet face, flows along the honeycomb flow channels of the monolith, exits the monolith at the outlet face into a retentate collector. Membranes may be applied to surfaces of the honeycomb monolith to allow for an additional layer of physical separation or chemical or catalytic separation which improve the separation characteristics of the monolith. Mullite, cordierite and silicon carbide (SiC), for example, may be used for these liquid filtration applications.

To have good industrial characteristics, the material should have good strength and durability in challenging environments combined with higher permeability. Challenging environments may include high pH, low pH, high temperature, low temperature, exposure to aqueous fluids, organic fluids, reactive chemical species, or combinations of these including fluctuations between high and low temperatures, fluctuations between high pH and low pH and mixtures of aqueous and organic materials. A combination of good strength and durability and higher permeability leads to higher product filtration flux and higher throughputs with potentially lower processing pressures and create longer product life.

High permeability generally implies higher porosity and larger pore size. A higher level of porosity is generally accompanied by a higher level of internal surface area, with greater exposure to corrosive attack. In general, higher permeability corresponds to reduced strength. In embodiments of the present invention, a porous mullite membrane support structure that may have increased filtration flux (increased pore size or density) while maintaining other important product attributes such as strength and corrosion durability are provided.

Various embodiments of the disclosure will be described in detail with reference to drawings. Reference to various embodiments does not limit the scope of the disclosure. Additionally, any examples set forth in this specification are not limiting and merely set forth some of the many possible embodiments for the claimed invention.

The following description of the invention is provided as an enabling teaching of the invention in its best currently known embodiments. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a component or ingredient includes embodiments having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase optional component or optional ingredient means that the component can or can not be present and that the description includes both embodiments of the invention including and excluding the component.

Reference will now be made in detail to embodiments of the invention, examples of which are illustrated in the accompanying drawings. Whenever possible, the same or similar reference numerals will be used throughout the drawings to refer to the same or like parts. It should be noted however that the drawings are for illustrative purposes only and are not necessarily drawn to scale.

Referring to FIG. 1, a monolithic multi-channel substrate 10 is shown having a porous monolithic body or module 150 defining a plurality of flow channels 110 disposed in the body and extending along the length of the substrate from an upstream inlet or feed end 1101 to a downstream outlet or exhaust end 1102. Porous channel walls 114 surround each of the plurality of flow channels 110. The porous body 150 further comprises a networked pore structure of interconnected pores forming torturous fluid paths or conduits 152. The tortuous paths 152 formed by the porous body 150 provide a flow path for separating filtrate which flows through the porous material to an exterior surface of the substrate for collection in a filtrate collector, from retentate, which flows through the flow channels to a retentate collector, separate from the filtrate collector. In embodiments, the filtrate may flow out of the monolith body through holes or slots in the monolith body (see FIG. 2). In embodiments, the inventive monolithic multi-channel substrate, as exemplified in the following description, can be used for liquid-phase separation in laboratory scale or in commercial scale, for extraction of one or more components from a fluid process stream.

The monolithic body 150 can have any desired predetermined size and shape. For example, although the body or module 150 is exemplified as a cylinder with a substantially circular cross-section in FIG. 1, it should be understood that the module 150 can be shaped to provide any elliptical or polygonal cross-section. To that end, exemplary and non-limiting monolith cross-sectional shapes include ellipses, circles, rectangle, square, pentagonal, hexagonal, octagonal, and the like. For consistency and simplicity, the cylindrical form of the module body 150 has been used primarily in the subsequent discussions.

The plurality of flow channels 110 may be distributed in parallel and symmetrically over the module cross-section. The flow channels also extend from the module upstream inlet end 1101 to the module downstream outlet end 1102, forming a pathway through which a process stream can pass. In the exemplified embodiment, the flow channel cross-sectional shape is circular or rounded. However, it should be understood that the flow channel cross-section shape can be any desired elliptical or polygonal shape that is continuous and which has substantially no sharp corners. Exemplary channel cross-sectional shapes include ellipses, circles, rectangle, square, pentagonal, hexagonal, octagonal, and the like. Even though the channel distribution is shown uniform in FIG. 1, the flow channels 110 can be distributed within the module in non-uniform ways. In an embodiment, the flow channels are substantially parallel. However, depending upon the geometry of the module, flow channels may not follow a straight course, and may not be parallel. For example, if there is sufficient web thickness where there would not be an overlap or intersection of non-aligned channels, the channels 110 can even be skewed (having a skewed angle less than 90°) in a non-parallel distribution. For a non-uniform channel distribution, the web thickness 130 will be in a range of different thicknesses (for example, about 0.2 to about 2 mm). It may be advantageous to have a skin thickness (e.g., >1 mm or 0.04 inch) in the rim 120 greater than the web thickness 130. The skin or rim thickness 120 is an independent parameter from the web thickness 130. The web thickness 130 is a measure of the distance between channels 110, while the skin or rim thickness 120 is a measure of the distance from the outside channel to the outer surface of the module, and affects the overall module strength and permeability.

In embodiments, the monolithic body 150 can be formed from any suitable porous material including inorganic or organic materials. In some embodiments, the monolithic body can for example be comprised of a polymeric material. In other embodiments, the monolithic body can be comprised of metallic or ceramic materials. In an embodiment, the monolithic body is comprised of a porous ceramic material. For example, and without limitation, in some embodiments the porous monolith body 150 is made from a ceramic composition selected from mullite ($3Al_2O_3$-$2SiO_2$), alumina ($Al_2O_3$), silica ($SiO_2$), cordierite ($2MgO$-$2Al_2O_3$-$5SiO_2$), silicon carbide (SiC), aluminum titanate, alumina-silica mixture, glasses, inorganic refractory materials, ductile metal oxides, pore formers and sintering aids. Mullite, for example, has high strength, high corrosion durability, and is easy to process.

The module or body 150 can be prepared by any conventionally known casting or extrusion methods. For example, the module or body can be comprised of a sintered ceramic composition having mullite as its primary phase. The sintered ceramic can be prepared from an extrudable plasticized batch composition comprised of ceramic forming raw materials, an organic binder system, and an optional liquid vehicle. The extrudable mixture can be extruded to form a green body of the desired configuration. The green body can be dried and fired for a time and at temperature sufficient to form a sintered ceramic structure. The filtrate conduits can be formed in the monolith, for example, at the time of manufacture by extrusion or by other means after extrusion. For example, filtrate conduits may be cut into the monolith after extrusion. For processing fluid streams in applications such as coarse microfiltration, extraction, fluid mixing, and the like, the porous monolith body 150 can be used by itself in the absence of an added membrane layer. However, for other fluid stream processing applications, a porous membrane can be deposited on at least a portion of the porous flow channel walls.

If desired, an optional intermediate layer 160 of porous materials that have smaller pore sizes than the pores of the monolith matrix can be deposited onto the channel wall 114 of the substrate or matrix body portion 150 and can be used alone or with additional layers 140. The coating layer 160 can serve one or more possible functions. In some embodiments, the coating 160 can be applied to modify the flow channel shape and wall texture, including such parameters as pore size, surface smoothness, and the like. In other embodiments, the coating layer 160 can be used to strengthen the monolithic body 150. In still further embodiments, the coating layer 160 can be used to enhance the membrane deposition efficiency and adhesion.

When present, the porous coating layer 160 may be deposited such that it exhibits a layer thickness in the range of from about 5 to 150 µm. Further, the pore volume of the optional coating layer 160 may have pore sizes in the range of from 2 nm to about 500 nm. Thus, one or more intermediate porous coating layers 160 can optionally be disposed on the inner surfaces or walls 114 of the plurality of feed flow channels 110 to form a nano- or meso-porous layer.

The optional layer 160 may be a material selected from the group consisting of alumina, silica, mullite, glass, zirconia, titania, and a combination of any two or more thereof. In an embodiment, the intermediate layer 160 is comprised of alumina, zirconia, silica or titania. The intermediate coating layer 160 may be applied by conventionally known wet chemistry methods such as a conventional sol-gel process or slip casting.

Optionally, an additional coating 140 providing a separation function can be further applied onto the optional intermediate coating layer 160 or directly on the inner surfaces or walls 114 of the plurality of feed flow channels 110 of the monolithic body 150. To that end, because the layer 160 can be used alone, without another layer, the term "coating" as used herein refers to embodiments comprising the use of the layer 160 alone, use of the layer 140 alone, or the use of both layers 140 and 160. Multiple layers of coatings may be present. The coating 140 can be comprised of inorganic or organic materials. For example, in some embodiments, the coating 140 can be a dense layer, or a non-metallic dense film that allows permeation of certain molecules in a mixture, such as SiC, or glass. In still other embodiments, the coating 140 can be a micro-porous layer comprised of, for example, zeolite, zirconia, alumina, silica, titania, or glass. These exemplary microporous coating materials can be used to provide a separation function in the molecular size level. In still further embodiments, the coating layer 140 can be a polymeric film. When present, the porous coating layer 140 may be deposited such that it exhibits a layer thickness in the range of from about 1 to 20 µm. Further, the pore volume of the optional additional coating layer 140 may have pore sizes less than about 200 nm.

Embodiments of monoliths made from compositions of the present invention can be used for separating, purifying, filtering, or other processing functions for a variety of liquid-phase mixtures through a plurality of tortuous paths 152 through the matrix of the porous body portion 150 having coated sections 1521 and a non-coated porous body sections 1522. In general, the concept of tortuosity is defined as the difference between the length of a flow path which a given portion of a fluid or a mixture of fluids will travel through the passage formed by the channel as a result of changes in direction of the channel and/or changes in channel cross-sectional area versus the length of the path traveled by a similar portion of the mixture in a channel of the same overall length without changes in direction or cross-sectional area, in other words, a straight channel of unaltered cross-sectional area. The deviations from a straight or linear path, of course, result in a longer or more tortuous path and the greater the deviations from a linear path the longer the traveled path will be.

Figure 3:
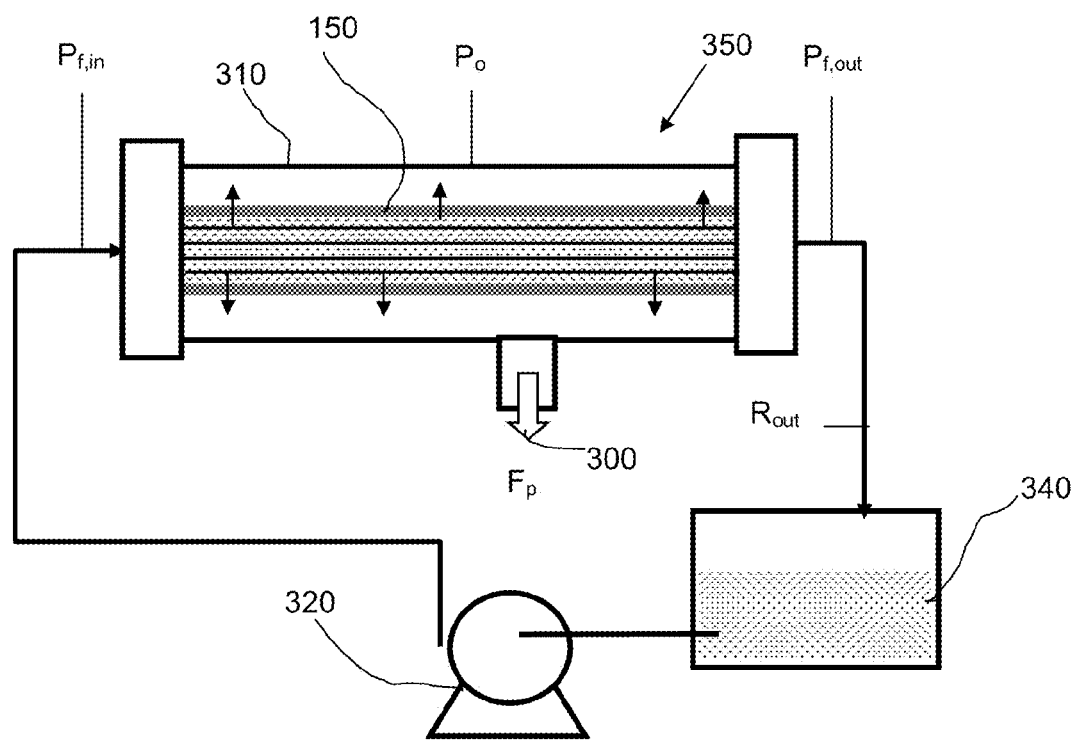
FIG. 3 is a schematic illustration of a cross-flow filtration system utilized in the filtration tests of Example 2.

In embodiments, the monolith or substrate of the present invention 10 has a structure that in use can be placed vertically as shown in FIG. 1, laid horizontally as shown in FIG. 3, in a slant, or aligned in any other position. Each of the feed flow channels 110 has an upstream inlet or feed end 1101 and a downstream outlet end 1102. The coatings 160 and 140 are supported and adapted to receive under a positive pressure gradient 170, an impure mixed feedstream 180 fed on the feed end 1101 of the plurality of flow channels 110. The positive pressure gradient 170 consists of first pressure drop 171 across the membrane 140 and optional coating layer 160 and a second pressure drop 172 through the porous monolithic body 150. The coatings 160 and 140 is adapted to process the impure mixed feedstream 180 into a purified filtrate or permeate 1852 that is formed from a portion of the impure mixed feedstream 180 that passes through an outside surface of the coating 140 and into the plurality of tortuous paths 152 of the matrix of the body portion 150, entering the coated section 1521 and exiting through the non-coated porous body section 1522. A byproduct or retentate stream 1802 remains from a portion of the impure mixed feedstream 180 that does not pass through the coated films 160 and 140 and exits through the outlet end 1102 of the plurality of feed flow channels 110.

Figure 2A:
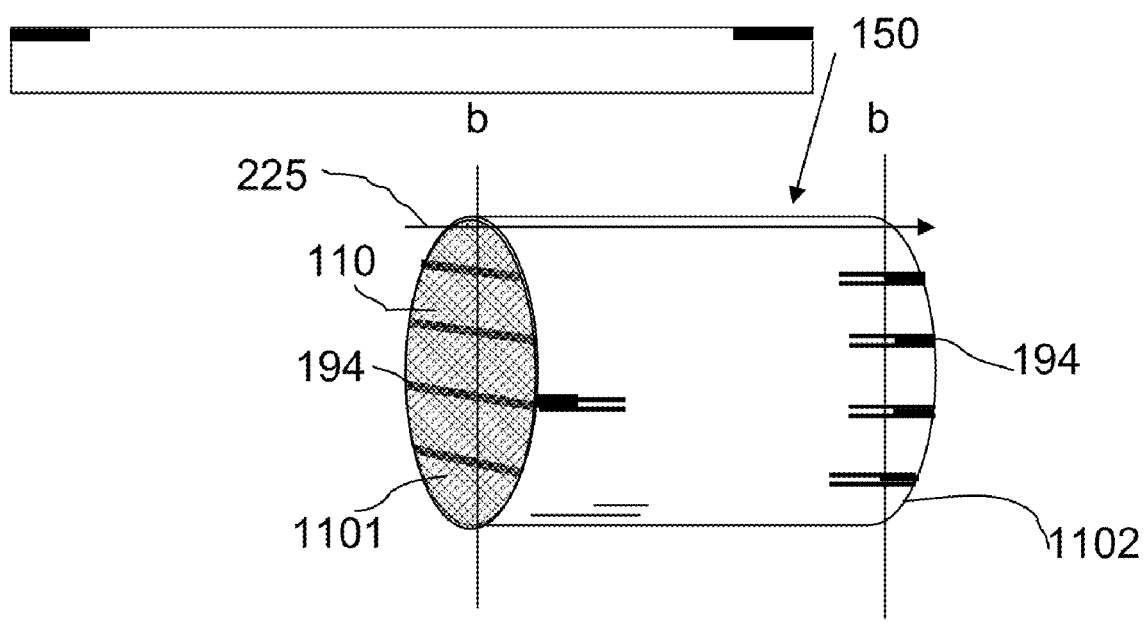
FIG. 2a is a perspective view of an exemplary monolithic body according to the disclosure further having a plurality of filtrate conduits formed therein.

With reference to FIGS. 2a and 2b, in additional embodiments, the monolith 150 may contains flow channels 110 as shown in FIG. 2a and illustrated in part of FIG. 2b, and one or more filtrate conduits 190 formed within the monolith 150 as shown in FIGS. 2a and 2b. Filtrate conduits are special flow channels structured and arranged to provide a pathway for filtrate material to flow through the interior of the monolith in a separate stream from retentate material.

In some embodiments, the filtrate conduits 190 may extend longitudinally from the upstream inlet or feed end to the downstream outlet or exhaust end of the structure. Alternatively, at least one of the filtrate conduits can extend longitudinally with the one or more flow channels along at least a portion of its length. As further shown in FIG. 2b, the filtrate conduit can include a channel or slot 192 extending transversely from the longitudinal portion to a filtrate collection zone for directing filtrate to the external surface of the monolith 150 or to a filtrate collection zone (see 300, FIG. 3). The filtrate conduit may further include a plurality of longitudinal chambers which connect with the channel. The slot 192 may be an opening, slot or channel at an end of the monolith or a hole formed in the monolith to connect the longitudinal portion of the filtrate conduit to the filtrate collection zone 300 (see FIG. 3). In embodiments, at least one slot may be formed in the filtrate conduit or slots may be formed at both the feed end and the outlet end of the device. Or, slots 192 may be holes introduced through the exterior surface of the monolith body at any point along the length of the monolith. The filtrate conduits 190 may be blocked at the feed end and the outlet end by barriers 194. Barriers 194 inhibit direct passage of the process stream into or out of the filtrate conduits at the feed end or the outlet end of the monolith. The barrier 194 may be plugs of material, inserted or introduced into the filtrate conduit 190. The barrier 194 may be made from the same material as the structure, or other suitable material, and the plugs may have a porosity similar to or less than that of the structure material.

In embodiments of the present invention, which provide filtrate conduits 190, blocked at both a feed end 1101 and an outlet end 1102 with barriers 194, received process stream enters the monolith 150 at the inlet end 1101 of the monolith. A portion of the received process stream, the retentate, flows through the monolith 150 through flow channels 110, to the exit end 1102 as shown by arrow 225 in FIGS. 2a and 2b. A portion of the received process stream, the filtrate, enters the monolith through flow channels 110, flows through the networked pore structure of the monolith 150, to a filtrate conduit 190, imbedded in the monolith structure. The filtrate conduits 190 are flow channels which are blocked at both ends by barriers 194, and which are open to the side of the monolith through slots or exit pathways 192 to allow filtrate to flow through the porous structure of the monolith, to filtrate conduits to the exterior of the monolith. Because the filtrate conduits 190 are blocked at both ends, they form low pressure pathways within the monolith structure. The fraction of the process stream that enters the pores of the monolith structure flow to this low pressure pathway through the pores of the material, and then exits the monolith through the slots or exit pathways 192, in a filtrate collection zone 300 (see FIG. 3) which is separate from the outlet end of the monolith, from which the retentate is collected. In this way, the process stream is separated into a retentate, which flows through the monolith from the inlet end to the exit end through flow channels 110, and a filtrate which flows into the monolith, enters the pore structure of the porous material, flows into a filtrate conduit 190, and exits the monolith through slits 192 in the side of the monolith 150 (as shown by the arrows 226 in FIG. 2b). The filtrate conduits 190 provide pathways having a low flow resistance compared to the flow channels, creating a pressure drop that allows filtrate to flow through the networked pore structure of the monolith to the filtrate conduits 190. The filtrate conduits are blocked by barriers 194 to an exterior surface of the monolith body.

The filtrate conduits 190 provide flow paths of lower flow resistance than that of flow channels 110 through the porous material, and the structure is constructed such that the filtrate conduits are distributed among the passageways to provide low pressure drop flow paths from the passageways through the porous material to nearby filtrate conduits. The plurality of filtrate conduits can carry filtrate from within the structure toward a filtrate collection zone 300 (Fp, see FIG. 3) disposed about the exterior surface of the monolithic body or module 150. Exemplary discrete filtrate conduits 190 are for example disclosed and described in U.S. Pat. No. 4,781,831.

FIG. 3 illustrates a liquid filtration system 350 that can be used with embodiments of the present invention. The liquid filtration system 350, illustrated in FIG. 3 shows a honeycomb monolith 150 in a housing 310. A liquid stream is pumped by a pump 320 into the inlet side of the monolith 150 in the housing 310 (Pf, in). The liquid flows through the monolith 150 and filtrate is separated out of the fluid as indicated by the arrows. The filtrate is removed from the housing through a filtrate collection zone 300 (Fp). Retained fluid (Rf) flows out through the outlet face of the monolith (Pf, out) and is collected in a retention zone 340. This retentate may be recycled through the monolith, or drained. This system can be used to perform the water flow test described in Example 2.

In use, the inventive filtration device can be used for separation processes wherein the mixed feedstream is a liquid-phase stream, such as a water-based solution containing other larger components or a mixed water and oil-based solution. The larger components can be larger molecules and/or particulates. For example, a water mixture can have finely-dispersed oil droplets from an industrial waste water stream. Water mixtures can have particulates such as in a beverage juice. Water mixtures can have macro molecules such as proteins. The membraned support is suitable for separation processes with water as the permeate, because water as the smallest molecule the liquid mixture would have a larger permeability through the substrate matrix than the other components. Moreover, the membraned support is also suitable for separation processes of liquid mixtures involving organic solvents where the organic solvent is the permeate. The liquid-phase stream could be an organic solvent-based solution containing other larger components.

In embodiments, filtrate conduits 190 may be absent (as shown in FIG. 1) or present (as shown in FIGS. 2a and 2b). In general, monolith substrates having smaller module hydraulic diameters (for example less than about 50 mm) provide adequate filtration without incorporating filtrate conduits 190. Larger substrates may require filtrate conduits in order to facilitate the removal of filtrate fluids from the internal portions of the larger substrate.

Table I shows liquid filtration mullite compositions and their physical properties and performance data. Alumina, silica and mullite raw material particle size and pore formers were used to create permeability. Fine and/or reactive materials as well as sintering aids and higher sintering temperatures were used to enhance strength and resistance to chemical attack. Physical property data, shown in Table I, were obtained using the mercury porosity determination method, standard rod and bar MOR testing and physical shrinkage measurements. Based on this data selected samples were prepared for corrosion durability and water flow testing, which was intended to simulate in use product performance testing.

TABLE 1

| Comp Code | Extrusion # | Porosity % | Total Intrusion cc/g | Median Diameter (Vol) um | d10 um | d90 um | d50 − d10/ d50 % | Hg Permeability 2 mdarcy | Bulk Density g/cc | Apparent Density g/cc | Std Dev psi | MOR (rods) psi |
|---|---|---|---|---|---|---|---|---|---|---|---|---|
| Std Mullite @ 1495 C. | | | | | | | | | | | | |
| EJQ-166 | 17300 | 37.7 | 0.1969 | 4.2 | 3.0 | 4.9 | 0.29 | 36 | 1.92 | 3.1 | 162 | 5104 |
| EJQ-166 | avg data | 38.9 | 0.2049 | 4.1 | 2.9 | 4.9 | 0.29 | 35 | 1.90 | 3.11 | 193 | 5104 |
| Mullite @ 1495 C. | | | | | | | | | | | | |
| KKS-166 | 18698 | 41.1 | 0.2277 | 6.1 | 2.8 | 9.3 | 0.54 | 75 | 1.81 | 3.07 | 312 | 6052 |
| Mullite @ 1550 C. | | | | | | | | | | | | |
| EJQ-166 | 19667 | 29.9 | 0.1415 | 4.1 | 3.0 | 4.7 | 0.26 | 26 | 2.11 | 3.01 | 425 | 8358 |
| KKS-166 | 18698 | 33.5 | 0.1598 | 6.5 | 3.4 | 10.7 | 0.48 | 67 | 2.09 | 3.15 | 311 | 9448 |
| NLH-102 | 19670 | 42.3 | 0.2353 | 7.8 | 3.9 | 11.4 | 0.50 | 116 | 1.80 | 3.12 | 235 | 5357 |
| Mullite @ 1600 C. | | | | | | | | | | | | |
| EJQ-166 | 19667 | 16.6 | 0.0652 | 3.9 | 2.9 | 4.7 | 0.24 | 15 | 2.55 | 3.06 | 1068 | 13250 |
| NLC-102 | 19153 | 28.6 | 0.1290 | 6.6 | 3.5 | 14.6 | 0.47 | 52 | 2.22 | 3.10 | 375 | 9146 |
| NLD-102 | 19154 | 33.2 | 0.1566 | 5.7 | 2.8 | 9.3 | 0.51 | 46 | 2.12 | 3.17 | 350 | 8267 |
| KJC-166 | 18199 | 43.3 | 0.2354 | 8.6 | 4.6 | 12.9 | 0.47 | 149 | 1.8 | 3.24 | 403 | 6903 |
| NLF-102 | 19668 | 33.8 | 0.1619 | 8.9 | 4.9 | 18.8 | 0.46 | 112 | 2.09 | 3.16 | 245 | 7625 |
| NLG-102 | 19669 | 32.3 | 0.1588 | 7.4 | 3.8 | 12.0 | 0.49 | 74 | 2.04 | 3.01 | 486 | 8477 |
| NLH-102 | 19670 | 34.3 | 0.1719 | 8.6 | 4.9 | 17.9 | 0.43 | 118 | 2.00 | 3.04 | 422 | 7564 |
| NLI-102 | 20846 | 49.6 | 0.3096 | 9.0 | 4.4 | 12.5 | 0.52 | 173 | 1.60 | 3.17 | 121 | 5139 |
| NLJ-102 | 20847 | 43.8 | 0.2544 | 9.4 | 4.8 | 12.8 | 0.49 | 182 | 1.72 | 3.07 | 157 | 6160 |
| NLK-102 | 20848 | 41.3 | 0.2295 | 10.7 | 4.8 | 16.7 | 0.55 | 213 | 1.80 | 3.06 | 159 | 5690 |
| NLL-102 | 22550 | 37.9 | 0.1940 | 9.2 | 4.4 | 14.3 | 0.52 | 141 | 1.95 | 3.14 | 361 | 7254 |
| NLM-102 | 23021 | 46.8 | 0.2781 | 8.2 | 3.5 | 12.6 | 0.57 | 140 | 1.68 | 3.17 | 322 | 5862 |
| NLN-102 | 23338 | 47.5 | 0.2933 | 10.7 | 5.4 | 15.2 | 0.50 | 249 | 1.62 | 3.09 | 183 | 5214 |
| NLO-1-2 | 24880 | 42.2 | 0.2325 | 9.8 | 4.5 | 15.4 | 0.54 | 181 | 1.82 | 3.14 | 254 | 6710 |
| NLP-102 | 24881 | 45.1 | 0.2707 | 12.7 | 5.5 | 20.7 | 0.57 | 314 | 1.67 | 3.03 | 190 | 4972 |

| Comp Code | Extrusion # | Std Dev psi | Shrink Mask/Fired % dia | Durability - Rod MOR Strength Cycle 0 | Cycle 1 | Cycle 2 | Cycle 4 | Wet Pickup lb/in | Water Flow at increasing pressure ml/min 15 psi | 30 psi | 45 psi | 60 psi | >EJQ @ 60 psi |
|---|---|---|---|---|---|---|---|---|---|---|---|---|---|
| Std Mullite @ 1495 C. | | | | | | | | | | | | | |
| EJQ-166 | 17300 | 167 | 6.9 | 5725 | 4481 | 4067 | 3896 | 0.20 | 136 | 298 | 471 | 623 | 1.00 |
| EJQ-166 | avg data | 167 | 6.4 | | | | | 0.20 | 135 | 298 | 469 | 628 | 0.98 |
| Mullite @ 1495 C. | | | | 5168 | 3801 | 3829 | 3618 | | | | | | |
| KKS-166 | 18698 | 134 | 13.9 | **** | **** | **** | **** | 0.16 | 143 | 345 | 550 | 722 | 1.11 |
| Mullite @ 1550 C. | | | | | | | | | | | | | |
| EJQ-166 | 19667 | 469 | 10.5 | **** | **** | **** | **** | **** | | | | | |
| KKS-166 | 18698 | 335 | 15.1 | **** | **** | **** | **** | 0.13 | 133 | 320 | 469 | 610 | 0.94 |
| NLH-102 | 19670 | 257 | 10.1 | **** | **** | **** | **** | 0.19 | 215 | 449 | 795 | 1075 | 1.65 |
| Mullite @ 1600 C. | | | | | | | | | | | | | |
| EJQ-166 | 19667 | 723 | 14.7 | **** | **** | **** | **** | **** | | | | | |
| NLC-102 | 19153 | 795 | 16.1 | **** | **** | **** | **** | **** | | | | | |
| NLD-102 | 19154 | 473 | 13.7 | **** | **** | **** | **** | **** | | | | | |
| KJC-166 | 18199 | 296 | 9.7 | **** | **** | **** | **** | 0.21 | 327 | 763 | 1157 | 1513 | 2.33 |
| NLF-102 | 19668 | 297 | 17.0 | **** | **** | **** | **** | 0.17 | 173 | 413 | 661 | 883 | 1.36 |
| NLG-102 | 19669 | 343 | 15.2 | **** | **** | **** | **** | 0.13 | 107 | 274 | 430 | 603 | 0.93 |
| NLH-102 | 19670 | 360 | 14.5 | **** | **** | **** | **** | 0.14 | 175 | 435 | 680 | 903 | 1.39 |
| NLI-102 | 20846 | 673 | 8.7 | 5193 | 3334 | 3119 | 3266 | 0.22 | 415 | 857 | 1337 | 1787 | 2.75 |
| NLJ-102 | 20847 | 230 | 13.2 | 6521 | 4713 | 4398 | 4300 | 0.16 | 280 | 597 | 897 | 1217 | 1.87 |
| NLK-102 | 20848 | 170 | 12.4 | 6043 | 4834 | 4542 | 4262 | 0.16 | 264 | 670 | 963 | 1257 | 1.93 |
| NLL-102 | 22550 | 1137 | 14.8 | 8002 | 6440 | 6086 | 5874 | 0.12 | 139 | 337 | 530 | 725 | 1.11 |
| NLM-102 | 23021 | 166 | 11.0 | 5630 | 3980 | 3980 | 3890 | | | | | | |
| NLN-102 | 23338 | 99 | 9.8 | 5240 | 3520 | 3090 | 3110 | | | | | | |
| NLO-1-2 | 24880 | 297 | 13.9 | 6680 | 4980 | 5130 | 4890 | | | | | | |
| NLP-102 | 24881 | 136 | 11.4 | 5010 | 3730 | 3600 | 3310 | | | | | | |

Table II shows mullite monolith compositions. Superior performance is noted for compositions codes: KJC-166, NLI-102, NLJ-102, NLK-102, NLM-102, NLM-102 and NLO-102.

about 50 μm or less than about 30 μm. In exemplary embodiments of the present invention, mullite was Mulcoa® 70-325 available from C-E Minerals (King of Prussia, Pennsylvania). In embodiments, the water swelling clay may be a bentenite-

TABLE II

| Code | EJQ-166 | NLC-102 | NLD-102 | KJC-166 | NLF-102 | NLG-102 | NLH-102 | NLI-102 |
|---|---|---|---|---|---|---|---|---|
| Batch Type | Mullite | Mullite | Mullite | Mullite | Mullite | Mullite | Mullite | Mullite |
| Materials | | | | | | | | |
| Alumina-Coarse 11um | | | 49.88 | 40.62 | | | | 40.62 |
| Alumina-Fine06um | | 14.73 | 15.00 | | | 12.95 | 7.58 | |
| Alumina-Coarse 16um | | 22.39 | | | | | | |
| Mullite | 90.00 | 41.42 | 24.09 | 38.57 | 90.00 | 71.93 | 77.45 | 38.57 |
| Baterite Clay | 10.00 | 21.46 | 19.28 | 14.46 | 10.00 | 10.08 | 9.93 | 14.46 |
| Titania | | | | | | | | |
| Silica | | 6.75 | 6.35 | | | 5.04 | | 6.35 |
| Feldspar | | | | | | | 4.99 | |
| Total inorganic | 100.00 | 100.00 | 115.00 | 100.00 | 100.00 | 100.00 | 100.00 | 100.00 |
| Pore Formers | | | | | | | | |
| Graphite-Fine | | 10.00 | 5.00 | 10.00 | 10.00 | 10.00 | 10.00 | 10.00 |
| Graphite-Coarse | | | | | | | | |
| Potato Starch | | 10.00 | 12.00 | 10.00 | 10.00 | 10.00 | 10.00 | 10.00 |
| Binders | | | | | | | | |
| Methocellulose | 6.00 | 6.00 | 6.00 | 6.00 | 6.00 | 6.00 | 6.00 | |
| Methocellulose | | | | | | | | 6.00 |
| Sodium Stearate | 1.00 | 1.00 | 1.00 | 1.00 | 1.00 | 1.00 | 1.00 | 1.00 |

| Code | NLJ-102 | NLK-102 | NLL-102 | NLM-102 | NLN-102 | NLO-102 | NLP-102 |
|---|---|---|---|---|---|---|---|
| Batch Type | Mullite | Mullite | Mullite | Mullite | Mullite | Mullite | Mullite |
| Materials | | | | | | | |
| Alumina-Coarse 11um | 8.92 | | | 30.62 | | | |
| Alumina-Fine06um | 8.92 | | 9.50 | 10.00 | | | 9.50 |
| Alumina-Coarse 16um | | | 27.79 | | 12.95 | | 27.79 |
| Mullite | 62.55 | 86.00 | 41.75 | 38.57 | 71.93 | 86.00 | 41.75 |
| Baterite Clay | 14.71 | 14.00 | 14.23 | 14.46 | 10.08 | 14.00 | 14.23 |
| Titania | | | 2.37 | | | | 2.37 |
| Silica | 4.90 | | 4.36 | 6.35 | 5.04 | | 4.36 |
| Feldspar | | | | | | | |
| Total inorganic | 100.00 | 100.00 | 100.00 | 100.00 | 100.00 | 100.00 | 100.00 |
| Pore Formers | | | | | | | |
| Graphite-Fine | 10.00 | | | | 10.00 | | |
| Graphite-Coarse | | 10.00 | 10.00 | 10.00 | | 15.00 | 15.00 |
| Potato Starch | 15.00 | 10.00 | 10.00 | 10.00 | 10.00 | 10.00 | 10.00 |
| Binders | | | | | | | |
| Methocellulose | | | | 6.00 | 6.00 | | |
| Methocellulose | 6.00 | 6.00 | 6.00 | | | 6.00 | 6.00 |
| Sodium Stearate | 1.00 | 1.00 | 1.00 | 1.00 | 1.00 | 1.00 | 1.00 |

The materials shown in Table II include inorganic materials, pore formers or burnout materials and organic binders and lubricants. The inorganic materials shown in Table II were combined in percent by weight to form a total inorganic mixture of 100%. Pore formers were added in weight percent as superadditions to the 100% inorganic mixture. In embodiments of the present invention, fine alumina may be a-alumina. In embodiments, the fine alumina ingredient may have a median particle size (d50) of less than 1 μm. In exemplary embodiments, fine alumina was A1000SGD® with a median particle size of 0.6 μm available from Alcoa (Pittsburgh, Pa.). In embodiments the coarse alumina ingredient may have a median particle size (d50) of between 5 and 20 μm, or between 10 and 20 μm. In exemplary embodiments of the present invention, coarse alumina was A10 with a median particle size of 11 μm available from Almatis (Frankfurt, Germany) and/or T64-325M with a median particle size of 16 μm, also available from Almatis. In embodiments, mullite is a mullite powder having an average particle size of less than type clay. In exemplary embodiments of the present invention, the water swelling clay is Bentenite L available from Southern Clay Products (Gonzales, Tex.). In embodiments, titania may be a rutile titanium dioxide. In exemplary embodiments, titania was TiPure R-101 available from DuPont (Wilmington, Del.). In embodiments, fine silica may have a median particle size of between 2 and 10 μm. In exemplary embodiments silica was Im-sil A-25 available from Unimin (New Canaan, Conn.). In embodiments, feldspar may be a potassium/sodium/calcium aluminum silicate ground to about 200 mesh for ceramic applications. In exemplary embodiments, feldspar was G-200 available from Feldspar Corp (Edgar, Fla.). In embodiments, graphite and potato starch are pore formers or burnout materials. In exemplary embodiments, graphite is 4602-(A625) graphite and 4740 graphite available from Asbury (Asbury, N.J.). In exemplary embodiments, potato starch (white bag) can be obtained from, for example, National Starch and Chemical Company, Bridgewater, N.J. or Emsland Starke, Emlichheim Germany.

In additional embodiments, pore formers such as rice starch, walnut shell flour or other materials can be used as a pore former. In embodiments, organic binders include methylcellulose and derivatives thereof. In exemplary embodiments, methylcellulose was Methocel A4M® and Methocel F240M® available from Dow Chemical (Midland, Mich.). In embodiments, lubricants include, for example, sodium stearate. In exemplary embodiments, the lubricant was Liga®, available from Peter Greven (Munstereifel, Germany).

In embodiments of the present invention, the pore formers include any material that burns out of the composition upon sintering. In exemplary embodiments the pore formers are graphite and potato starch, but any material may be used. For example, rice starch or walnut shell flour may be used. Each of these pore formers creates pores having different characteristics and sizes. Potato starch, for example, creates larger pores. In embodiments of the present invention, it is found that 10-30% pore former creates pores in the sintered material that have desirable characteristics. More than 30% pore former leads to higher porosity, and reduces the strength of the material. Less than 10% pore former creates a material with reduced porosity and leads to a material with less than desirable permeability. In additional embodiments, a pore former element is present in a combination of graphite and potato starch where the graphite is present in a range of 5 to 10% and the potato starch is present in the range of 5 to 20%. In additional embodiments, the pore former is graphite and potato starch combined to create 20% pore former. According to embodiments of the disclosure, the total pore volume or porosity % P of the ceramic monolith may be in the range of from 10 to 60%, from 20 to 60%, from 30 to 60%, from 35 to 60%, from 40 to 60% or from 40 to 50%, including exemplary porosity values of 37.9%, 41.3%, 42.2%, 43.3%, 43.8%, 46.8% and 49.6%. Still further, the total porosity of the ceramic monolith can also be within a range derived from any two of the aforementioned porosity values.

In embodiments, the pore volume or total intrusion (in cc/g) may be from 0.10-0.40 cc/g, from 0.15-0.35 cc/g, from 0.18 to –0.32 cc/g, 0.2-0.30 cc/g, including exemplary pore volumes of 0.1940, 0.2325, 0.2354, 0.2295, 0.2544, 0.2781, and 0.3096. In still further embodiments, the total porosity of the monolithic body can be in a range derived from any two of the above mentioned porosity values.

Figure 4:
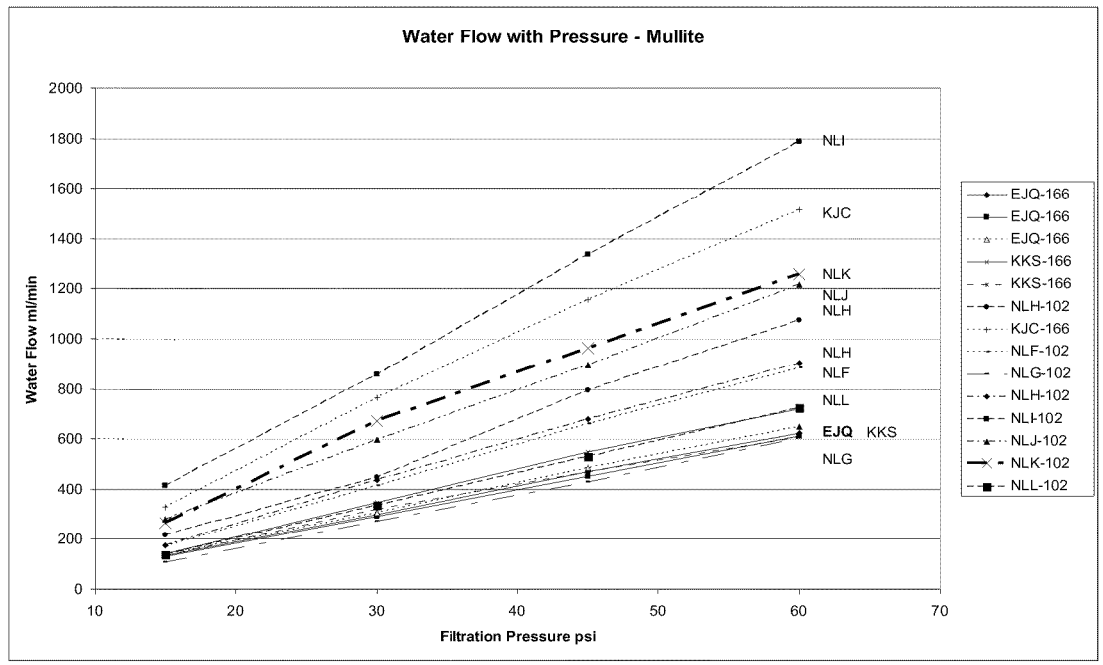
FIG. 4 is a graph illustrating the relationship between water flow and filtration pressure for a number of embodiments of mullite monolith bodies of the present invention.

FIG. 4 is a graph illustrating the relationship between water flow and increasing filtration pressure for a number of embodiments of the mullite materials of the present invention. Most mullite compositions which represent embodiments of the present invention have improved water flow performance with increasing process pressure compared to the EJQ standard material. The test samples were core drilled from coated 5.66" monoliths.

Figure 5:
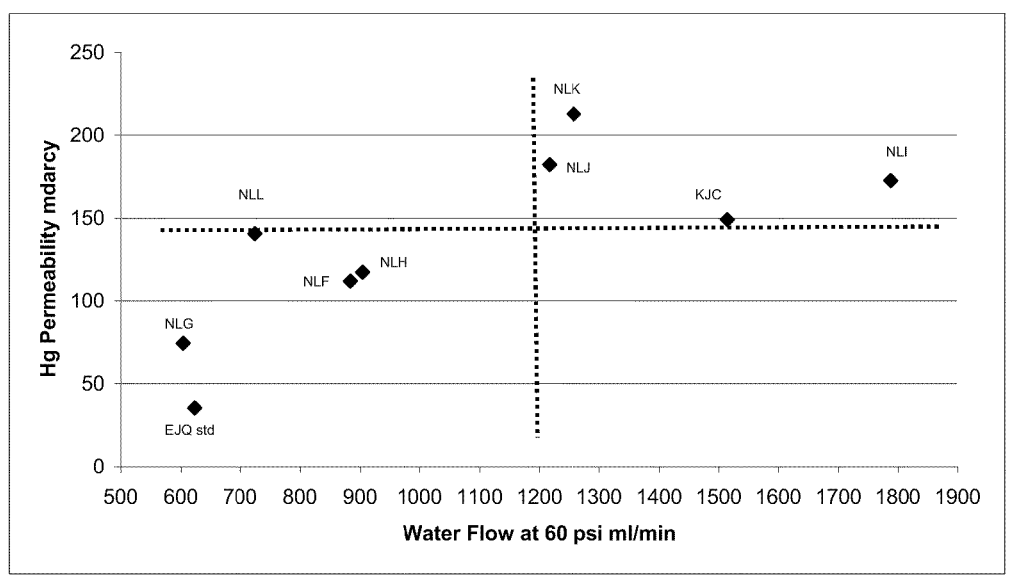
FIG. 5 is a graph illustrating the relationship between measured Hg permeability and water flow at 60 psi (measured in ml/min) for a number of embodiments of the mullite monolith bodies of the present invention.

The pore size and total porosity % P are values that can be quantified using conventionally known measurement methods and models. For example, the pore size and porosity can be measured by standardized techniques, such as mercury porosimetry. FIG. 5 is a graph illustrating the relationship between measured Hg Permeability and water flow in psi (measured in ml/min) for a number of embodiments of the mullite materials of the present invention. All Hg permeability measurements were taken using a Micrometrics Autopore IV 9520 Mercury Porosimeter. In an embodiment, a Hg Permeability Target was chosen at 140 mDarcy. In general, to achieve twice the water flow of the standard (EJQ) composition, the Hg permeability limit must be set at approximately four times that of the standard. Therefore the Hg permeability target was set at 140 mDarcy (See dotted lines in FIGS. 5, and 7-10). Material examples with a Hg Permeability Target at or above 140 mDarcy are considered to be desirable compositions. However, embodiments of the present invention may deviate from this target. This Hg permeability limit is equivalent to approximately twice the water flow of the standard EJQ when using the application based water flow test.

Figure 6:
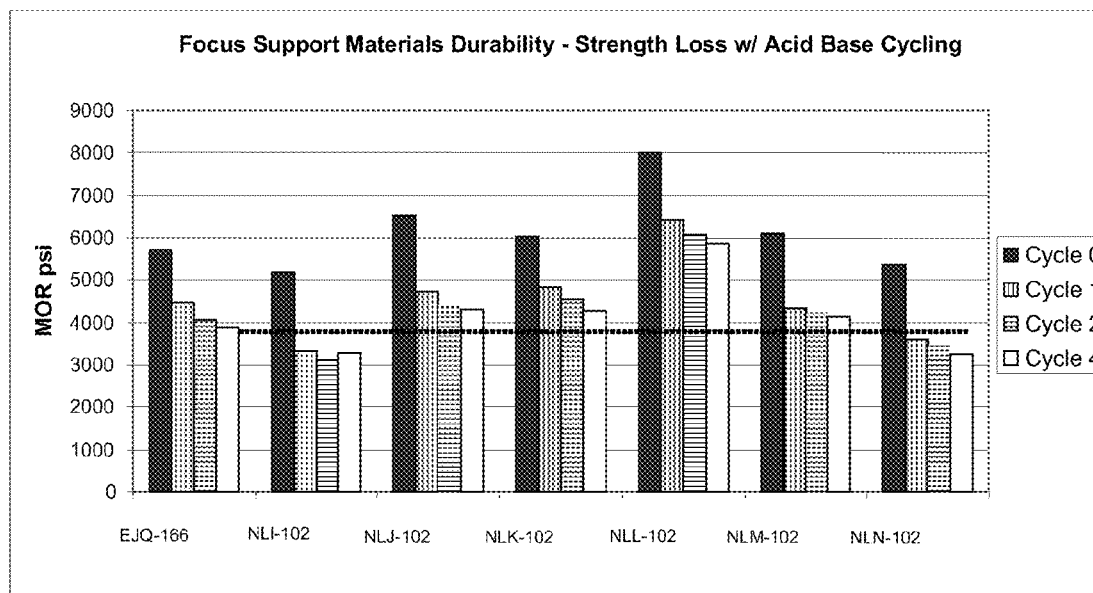
FIG. 6 is a graph illustrating durability of a number of embodiments of the mullite materials of the present invention in acid and base environments over multiple acid/base durability test cycles.

FIG. 6 is a graph illustrating durability of a number of embodiments of the mullite materials of the present invention in acid and base environments over multiple durability test cycles. In acid and base environments the strength of mullite MOR (modulus of rupture in psi) rods decreases, then levels off somewhat within the multiple cycling intervals. Several compositions have higher strength than the standard after four cycles. The four cycle strength limit was set at 3900 psi, equal to that of the standard EJQ after four cycles. FIG. 6 shows several compositions that show improved MOR characteristics compared to the standard EJQ sample based on the four cycle MOR data.

Figure 7:
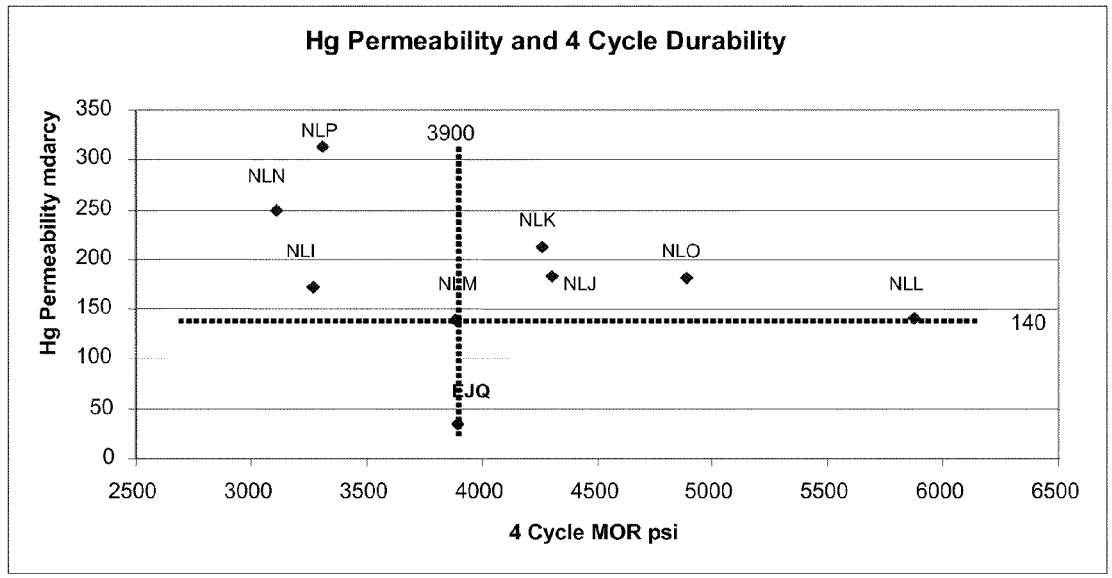
FIG. 7 is a graph illustrating the relationship between measured Hg Permeability and MOR for a number of embodiments of the mullite materials of the present invention.

FIG. 7 is a graph illustrating the relationship between measured Hg permeability (shown in FIG. 5) and MOR (shown in FIG. 6) for a number of embodiments of the mullite materials of the present invention. Compositions that showed a measured Hg permeability greater than 140 (four times the EJQ standard, from FIG. 5, the target) and a four cycle measured MOR greater than that shown by the EJQ standard (from FIG. 6, the target) were identified. Several compositions, NLM, NLK, NLJ, NLO, and NLL, meet or exceed the 4 cycle durability strength target and the Hg Permeability target.

Figure 8:
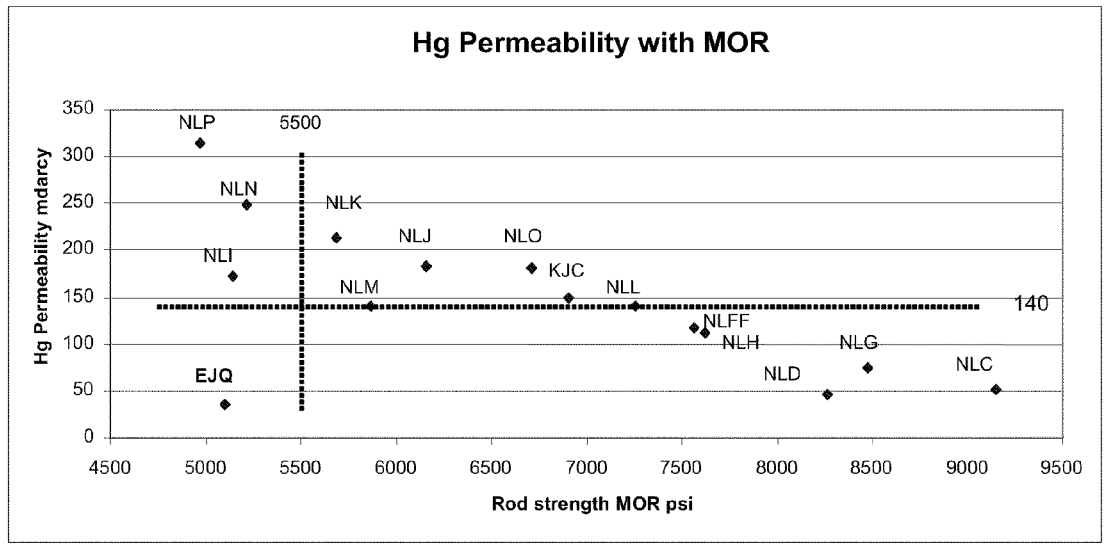
FIG. 8 is a graph illustrating the relationship between measured Hg Permeability and Rod Strength MOR for a number of embodiments of the mullite materials of the present invention.

FIG. 8 is a graph illustrating the relationship between measured Hg permeability and rod strength MOR for a number of embodiments of the mullite materials of the present invention. Relative Hg permeability and MOR strength limits were set based on successful water flow and corrosion durability performance test data. Permeability and rod strength MOR were measured after the 4-cycle durability test. In general the four cycle durability test is passed when the mullite composition has a starting MOR strength (before passing through the 4-cycle durability test) of 5500 psi or above. FIG. 8 shows Hg permeability with the initial rod MOR strength. In embodiments of the present invention, the compositions that meet our application based water flow and corrosion durability tests are also shown here to meet the limits set for Hg permeability and initial MOR strength. More physical property data is available using the more generic Hg permeability and initial MOR strength tests.

Figure 9:
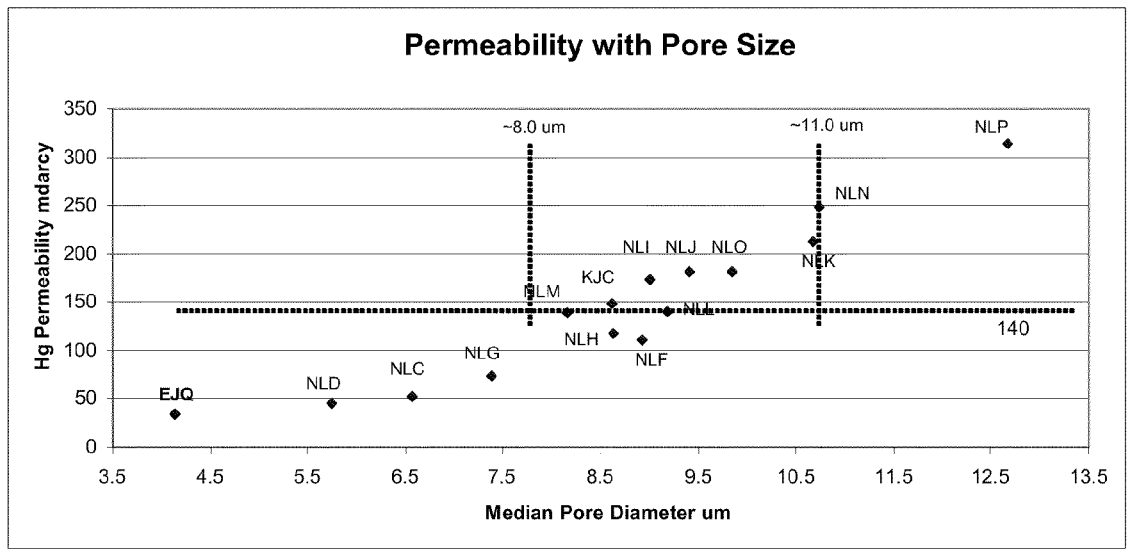
FIG. 9 is a graph illustrating relationship between measured Hg Permeability and Pore Diameter.

FIG. 9 is a graph illustrating relationship between measured Hg permeability and pore diameter, and illustrating that embodiments of mullite materials of the present invention having a range of pore diameters between about 8.0 μm and about 11.0 μm provide a good range of permeability and strength profiles.

Figure 10:
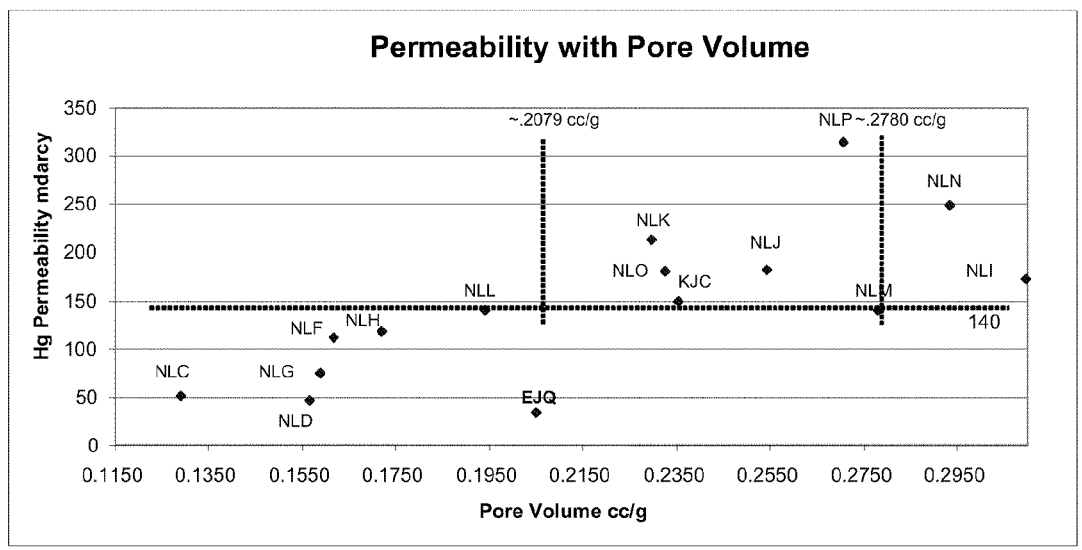
FIG. 10 is a graph illustrating Hg Permeability compared to Pore Volume.

FIG. 10 is a graph illustrating Hg permeability compared to pore volume, and illustrating that embodiments of mullite materials of the present invention having a range of pore volume of between about 0.2079 cc/g and about 0.2780 cc/g (dotted vertical lines) provide a good range of permeability and strength profiles based on Hg permeability and initial MOR strength targets. EJQ, the standard mullite (control) showed a permeability of approximately 0.2049 cc/g. In embodiments, mullite materials of the present invention have a pore volume between about 0.185 and 0.30 cc/g.

In embodiments of the present invention, improved compositions of mullite result in an increased filtration permeability of up to 2× compared to standard mullite materials (EJQ) as measured by the water flow test illustrated in FIG. 3, and shown in FIG. 4.

In embodiments, the compositions of the present invention, shown in Table II, have the following raw material characteristics. Using mullite (Mulcoa 70-325) as the base material for the mullite compositions, the key materials for balancing both permeability and strength are water swellable clay (bentenite) (10-15%) as a pore former and sintering aide, coarse alumina (10-40%) as a pore former, fine alumina (10% or less) as a sintering aide, graphite (5-10%) as a pore former for fine connected pores and starch (10-15%) as a pore former which yields more coarse pores for permeability. In embodiments, ranges of these materials to give a mullite monolith with the desired permeability and strength are: 10-15% water swellable clay (bentenite); 10% or less fine alumina; 10-40% coarse alumina; 20% pore former; 5%-10% graphite, and 10%-15% starch.

EXAMPLES

To further illustrate the principles of the present invention, the following examples are put forth so as to provide those of ordinary skill in the art with a complete disclosure and description of how embodiments of the porous monolithic substrates of the present invention are made and evaluated. They are intended to be purely exemplary of the invention and are not intended to limit the scope of what the inventors regard as their invention. Unless indicated otherwise, parts are parts by weight, temperature is ° C. or is ambient temperature, and pressure is at or near atmospheric.

Example 1

Preparation of Monoliths and Monolith Samples

A ram extrusion process was used to form 5.66" diameter honeycomb monolith structures with ~100 cells per square inch and ~0.24" wall thickness (dependent on material shrinkages) for each example as disclosed in Table II. Mulcoa 70-325 was used as the base material for the mullite compositions. Rods were also made for strength measurements. The basic process consisted of dry blending the materials, in the proportions defined in table II above, for 5 minutes in a Littleford mixer, then using a mix/muller to add sufficient amount of water to form a plastic deformable batch. A 200 ton Loomis ram extruder was then used to de-air and plasticize and finally extrude the 5.66" diameter honeycomb. The honeycombs were microwave dried then sintered in a gas or electric kiln to 1495° C., 1550° C. or 1600° C. These honeycombs were used to generate the data shown in FIGS. 4-10.

In embodiments, the sintering temperature may be a key component in maintaining the material strength while increasing permeability. Below a sintering temperature of 1600° C. very few combinations of pore formers and sintering aids would yield the desired performance properties. Table I shows some materials sintered at 1495° C. and 1550° C. The KKS composition appeared to have sufficient strength but insufficient permeability after sintering at 1495° C. and NLH was slightly less than optimal on both strength and permeability after sintering at 1550° C.

Full size 5.66" diameter by 10" length monoliths were coated. The coating layer was a mixture of coarse and fine alumina powder, mixed with water and polymeric binder (polyvinyl alcohol) and adjusted to a pH of about 3.5 to create a stable suspension. Parts were coated using a slip cast process, dried, and fired to adhere the membrane to the support. One inch diameter×2 inch length samples were core drilled out of the supports for water flow testing. From these selected samples core drilled test monoliths were used to simulate liquid filtration flow improvements using a "water flow" test, run at several process pressures. FIG. 4 shows several compositions that have improved water flow with increasing process pressures over the standard EJQ composition.

Example 2

Water Flow Test

Water flow testing was conducted using a cross-flow filtration apparatus as illustrated in FIG. 3. The pressure inside the membrane channel, $P_f$, is controlled at a higher value than that in the exterior of the membrane body, $P_o$. As a result, the water permeates through the membrane and comes out of the monolith body perimeter skin. The permeation flow rate, $F_p$, was measured and recorded. Water was pumped/circulated through the monolith sample at a constant pressure. The flow through the cell wall at that pressure was measured. Flow was measured at four pressures, 15 psi, 30 psi, 45 psi and 60 psi. Flux was calculated by the following equations where $F_p$=permeation flow rate and $SA_m$=membrane surface area:

$$Flux = \frac{F_p}{SA_m}$$

Example 3

Corrosion Test

A corrosion durability test was performed on rods of the selected compositions, made according to Example 1. The durability test consisted of four cycles. Each cycle included 24 hours at 95° C. in 0.5 pH $HNO_3$ and 24 hours at 95° C. in 13.5 pH NaOH. Rod strength was then measured after each cycle. FIG. 6 shows several compositions with equal or greater MOR strength after durability cycling when compared to the standard EJQ mullite.

It will be apparent to those skilled in the art that various modifications and variations can be made to the present invention to include processing applications, such as sensors, without departing from the spirit and scope of the invention. Thus it is intended that the present invention cover the modifications and variations of this invention provided they come within the scope of the appended claims and their equivalents.

The invention claimed is:

1. A composition for forming a filtration device for receiving a process stream and for separating the process stream into a filtrate and a retentate, the composition comprising:
   a. greater than 30% wt. mullite powder;
   b. 10-15% wt. bentenite;
   c. less than 15% wt. fine alumina and between 8-42% wt. coarse alumina, and
   d. a super addition of 10-30% wt. pore former, wherein the pore former is a combination of graphite and potato starch.

2. The composition of claim 1 wherein the pore former comprises 5-10% wt. graphite.

3. The composition of claim 2 wherein the pore former comprises 5-15% wt. potato starch.

4. The composition of claim 1 further comprising 2-10% wt, silica.

* * * * *